July 4, 1950
H. D. ROOP
2,513,818
BALANCED CIRCUITS FOR DETERMINING THE
INTENSITY OF IONIZING RADIATION
Filed Oct. 19, 1945
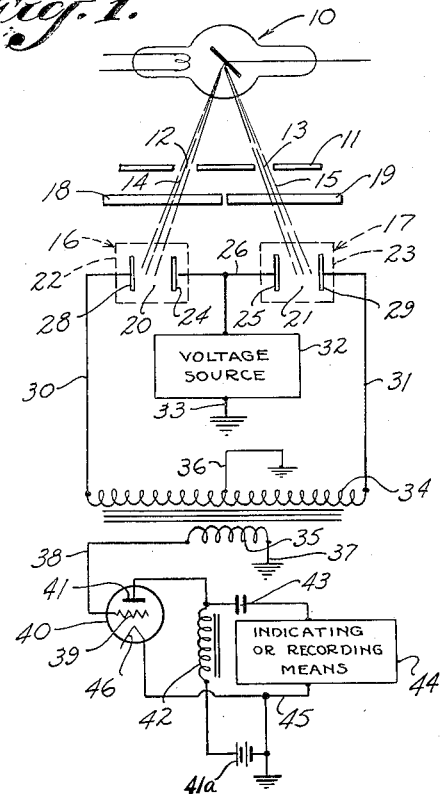
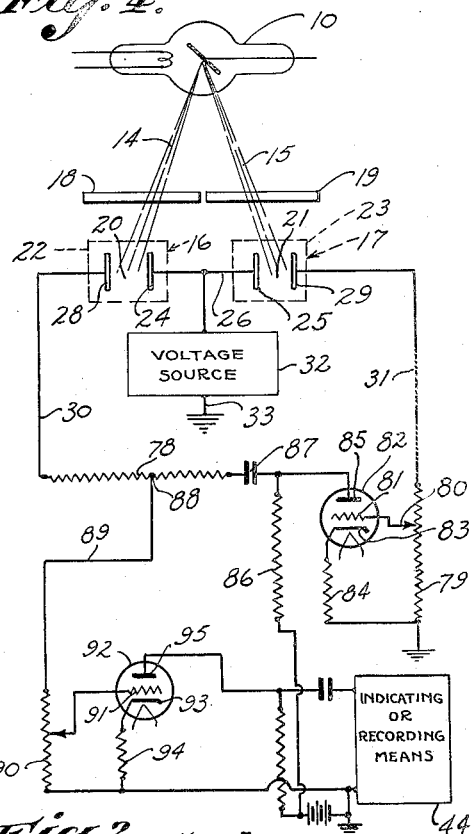
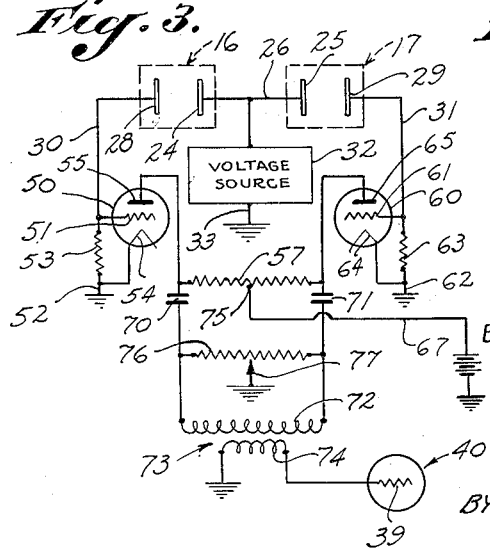
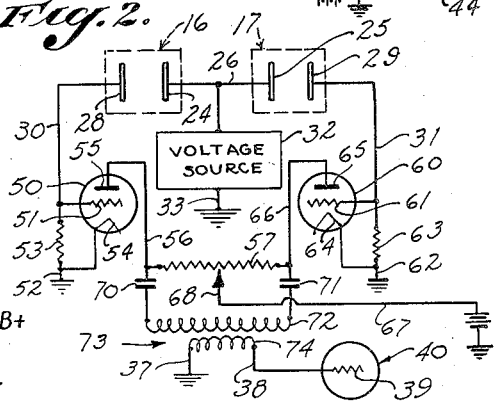
INVENTOR:
HAROLD D. ROOP,
BY HARRIS, KIECH, FOSTER & HARRIS,
FOR THE FIRM
ATTORNEYS.

Patented July 4, 1950

2,513,818

UNITED STATES PATENT OFFICE 2,513,818

BALANCED CIRCUITS FOR DETERMINING THE INTENSITY OF IONIZING RADIATION

Harold D. Roop, Los Angeles, Calif., assignor to Automatic X-Ray Corporation, Los Angeles, Calif., a corporation of California Application October 19, 1945, Serial No. 623,335

7 Claims. (Cl. 250—83.6)

My invention relates to electrical circuits for determining the intensity of an ionizing radiation, e. g., circuits which are accurately responsive to X-ray intensity. More particularly, the invention relates to circuits usable in conjunction with ionization chambers or other X-ray sensitive devices to measure or compare the intensity of pulsating X-rays, particularly the intensity of X-rays transmitted through an object to be inspected.

X-rays are widely used in the examination and inspection of engineering material to determine the structure thereof or the flaws therein. The customary methods of application are confined to radiography or fluoroscopy. I have found that the expensive, complicated, and elaborate equipment used in radiography or the fluorescent screens and handling devices employed in industrial fluoroscopy may be replaced usually by a simple means for transmitting a beam of pulsating X-rays through the material in question and simultaneously comparing the intensity of the radiation emerging therefrom with the intensity of a similar beam transmitted through a standard piece of the material. This comparison may be accomplished by employing a pair of X-ray sensitive devices, as for example ionization chambers, one of which intercepts the radiation through the standard piece of the material and the other the radiation through the unknown. The currents caused to flow by the excitation of the X-ray sensitive devices may then be amplified by a suitable voltage amplifier and used to actuate an indicating instrument or control network. Great sensitivity can be attained by this process if the currents arising in the X-ray sensitive devices are caused to be of opposite polarity so that they may be opposed in such a way that only the difference is amplified. I have found that such an arrangement constitutes a sensitive and reliable means whereby X-rays may be employed not only to reveal automatically the presence of flaws, voids, inclusions, etc., in any material, but may be used to perform functions practically impossible of achievement by radiography or fluoroscopy.

For example, this device may be employed as an accurate thickness gauge for sheets of any material; as a density gauge for liquids; as a gauge for detecting any departure from standard composition in a liquid mixture; as a gauge for measuring moisture content; etc. These applications require the use of sensitive electronic equipment. Any spurious effects or extraneous influences occurring in the input circuit of the electronic network are amplified and seriously impair the accuracy of the determinations sought for. The most troublesome source of spurious effects is the source of potential which applies a saturating voltage to the X-ray sensitive devices.

X-ray sensitive devices, such as photocell-fluorescent screen combinations, ionization chambers, etc., require the application of a steady D. C. saturating potential, one side of the source being customarily grounded. Attempts to use two sources of saturating potential, one of which is plus-grounded and the other minus-grounded, are not satisfactory in practical operation because the accurate determination of X-ray intensities requires that each source of voltage supply be exactly the same value of potential. Any small difference in voltage affects the system even when supersaturating voltages are used. Batteries are unsuitable for this purpose because of the effect of unequal rates of aging. In the case of A. C. operated voltage supplies, any transient inequalities or variations due to imperfect filtering or line voltage variation cause an effect to be transmitted through the X-ray sensitive device to the input terminals of the amplifier and appears in the output terminals so as to produce a false indication.

An important object of my invention is to provide a method and apparatus whereby the pulsating output currents of two X-ray sensitive devices are caused to be in opposition when only a single source of saturation voltage is employed. Thus, any variation in voltage, or other undesirable effect arising in the saturating voltage supply, is applied equally to each X-ray sensitive device and is, therefore, neutralized in the balanced circuit which is a part of the invention.

Another object of the present invention is to provide a system for specifically and accurately determining the intensity of X-rays by employment of a balanced electrical circuit which does not respond to fluctuations in the voltage applied to the circuit or to the X-ray tube.

It is another object of the invention to employ a pair of X-ray sensitive devices, such as a pair of ionization chambers, energized by a single, end grounded source of voltage, the current dividing between the two devices.

Another important object is to provide a novel arrangement for opposing the pulsating outputs of two X-ray sensitive devices to obtain a net voltage which, if desired, may be supplied to an amplifier feeding an indicating or recording device.

A further object of the invention is to develop a net pulsating potential from two X-ray sensitive devices and to employ this net potential in developing potentials in a grid circuit of a vacuum tube, one portion of the grid circuit being grounded.

Further objects and advantages of the invention will be evident from the following description of several exemplary embodiments.

Referring to the drawing, which is merely exemplary:

Fig. 1 represents diagrammatically a simplified electrical circuit of the invention in which a transformer means is employed to balance against each other or oppose the outputs of two ionization chambers;

Figs. 2 and 3 are alternative circuits showing preferred methods of connection when employing transformer means; and Fig. 4 is a wiring diagram of another alternative embodiment of the invention employing a phase inversion circuit for obtaining a net output from two ionization chambers.

Referring particularly to Fig. 1, an X-ray tube 10 produces a pulsating radiation, shown as directed toward a collimating or beam-forming plate 11 having apertures 12 and 13, the pulsations in the radiation being the result of energizing the tube 10 by an alternating or pulsating potential. The plate 11 is formed of material opaque to X-rays, such as lead, and the apertures 12 and 13 produce first and second beams 14 and 15 of the radiation which are directed respectively toward two X-ray sensitive devices, illustrated as ionization chambers 16 and 17. The use of the collimating or beam-forming plate 11 is not always necessary. Even in its absence, portions of the radiation will enter the ionization chambers and the use of the term "beams" is inclusive of such portions.

Respectively disposed in the beams 14 and 15 to absorb a portion of the incident electromagnetic energy and to transmit the remainder to the ionization chambers are first and second objects, respectively designated as a test specimen 18 and a reference or standard specimen 19. The use of the invention suggested in Fig. 1, while merely exemplary, contemplates a comparison of the intensity of the radiation transmitted by the reference specimen 19, which remains in the second beam 15, with the intensity of the radiation transmitted by test specimens 18 sequentially interposed in the first beam 14.

The ionization chambers 16 and 17 exemplify one system for measuring or determining the relative intensity of the two transmitted pulsating beams. It is desirable that the transmitted beams respectively enter spaces 20 and 21 containing a gas which is ionized by the radiation of the beams. The spaces 20 and 21 are bounded by first and second electrode means which maintain a high potential across the spaces 20 and 21. In the preferred arrangement, two separate ionization chambers 16 and 17 are employed, these chambers being of the conventional type or being constructed in accordance with those shown in my copending application, Serial No. 623,334, filed October 19, 1945 now Patent No. 2,458,099. As illustrated, the ionization chambers 16 and 17 provide separate housings 22 and 23, indicated by the dotted lines, each housing containing an appropriate ionizable gas, such as air, and containing paired electrodes. More specifically, the first electrode means is shown as comprising electrodes 24 and 25 interconnected by conductor 26, while the second electrode means is shown as comprising electrodes 28 and 29, respectively connected to output conductors 30 and 31. The spaces 20 and 21 are respectively bounded by the paired electrodes 24, 28 and 25, 29. A single source of high potential, direct current voltage is indicated at 32, with one end terminal grounded as indicated at 33, the other end terminal being connected to the conductor 26 to deliver exactly equal potentials to the electrodes 24, 25.

The invention contemplates means for opposing or balancing against each other the pulsating outputs of the two ionization chambers to obtain a net pulsating output representing the net difference between the intensity of the transmitted beams or, in the example illustrated, a comparison between the transmission qualities of the test specimen 18 and the reference specimen 19. This means is illustrated in Fig. 1 as a transformer means, including a center-tapped primary winding 34 with its ends respectively connected to the conductors 30 and 31 and a secondary winding 35. The center tap of the primary winding 34 is grounded as indicated by the numeral 36 and is thus connected to the grounded terminal of the voltage source 32, this terminal being thus electrically centered with respect to the winding 34. One terminal of the secondary winding 35 is grounded as indicated by ground connection 37, and the other terminal is connected through a conductor 38 to a grid 39 of an electron tube 40, shown as a conventional triode acting as a voltage amplifier. This tube provides an anode or plate 41 connected to a suitable source of plate potential, indicated at 41a, through an impedance or resistor 42. It is also connected, through a condenser 43, with a suitable indicating or recording means 44 responsive to the output of the tube 40. As shown, this indicating or recording means 44 is connected by a conductor 45 with a cathode 46 of the tube 40. It should be clear, however, that the tube 40 may be the first of several in a multi-stage amplifier feeding the indicating or recording means 44.

The operation of this system is as follows. With a given test specimen 18 interposed in the first beam 14 and the reference specimen 19 interposed in the second beam 15, the ionization chambers will respectively receive pulsating transmitted beams acting to ionize the gas in the two spaces 20, 21 and thus control the current flow between electrodes 24, 28 and between electrodes 25, 29. The single X-ray tube 10 forms the two beams in question, irrespective of the use of the collimating plate 11, wherefore there is no change in relative intensities because of voltage fluctuations applied to the tube 10. Rather, the relative intensities of the transmitted beams are controlled by the respective absorption of the specimens 18 and 19. A first pulsating current will flow from the voltage source 32 through the ionization chamber 16, the conductor 30, and the left half of the primary winding 34 to return to the voltage source through the ground connection. This first pulsating current will be a measure of the intensity of the beam transmitted by the test specimen 18. A second pulsating current will flow from the voltage source 32 through the ionization chamber 17, the conductor 31, and the right half of the primary winding 34 to return to the voltage source through the grounded connection. This second pulsating current will be a measure of the intensity of the beam transmitted by the reference specimen 19. These pulsating currents flow simultaneously toward the center tap of the primary winding 34 and produce a net flux linking the secondary winding 35. If the intensity of the transmitted beams is equal, the net flux will be zero but any differential in intensity of the beams creates a net directional flux which induces a pulsating potential in the secondary winding 35 applied to the grid 39 of the electron tube 40. The output potential of the tube is delivered to the indicating or recording means 44.

It is very desirable that some portion of the input circuit of the electron tube 40 be grounded as compared with systems in which this input circuit remains above ground potential. It is also very desirable that the potentials applied to the ionization chambers 16 and 17 be exactly equal. The system shown in Fig. 1 permits accomplishment of these ends. The single voltage source 32 is important in this regard. Attempts to use separate voltage sources for the two ionization chambers have not been successful. Even very slight differences in the potentials applied to the ionization chambers will not give satisfactory results. The employment of two batteries in this connection gives no assurance of equal voltages as the output voltages may drop unequally with age. Similarly, a pair of individual rectifiers, respectively connected to the ionization chambers, will usually produce slightly different potentials due to differences in design or inequality of the non-linear components of the rectified voltages. Any such slight difference in potential between the conductors 30 and 31, arising from use of separate voltage sources, will be inductively communicated to the grid 39 and will be amplified in the tube 40 to produce incorrect data from the indicating or recording means 44.

On the other hand, if a single voltage source 32 is utilized, be it a battery or a rectifier circuit, these difficulties are overcome. This is true even if the output voltage is not exactly constant as any "hum" or, in fact, any potentials in the first and second circuits arising from extraneous influences such as the so-called static commonly considered as a source of noise in radio receivers, are neutralized by the balanced circuits.

Another important concept of the invention is to employ circuits which are properly balanced with reference to ground potential. This again permits production of a net potential which can be applied to the grid of an amplifier means, e. g., one or more of the tubes 40. This gives the system stability and permits accurate data to be obtained from the indicating or recording means 44.

The circuit suggested in Fig. 1 will be found entirely satisfactory in many installations, particularly where the X-ray sensitive devices constitute a relatively low impedance source such as, for example, a photomultiplier tube-fluorescent screen combination. However, it is not as sensitive on higher-impedance, X-ray sensitive devices as the circuits suggested in Figs. 2 and 3, primarily in view of the fact that it does not provide well-matched impedances as between the ionization chambers or other high impedance, X-ray sensitive devices and their respective halves of the primary winding 34. The circuits of Figs. 2 and 3 provide a more accurate impedance match and greater sensitivity both because of this feature and because of additional amplification.

In Fig. 2, the balanced circuits for the ionization chambers 16 and 17 include vacuum tube means more nearly matching the impedance of the ionization chambers or other high impedance, X-ray sensitive devices. For example, the first circuit includes an electron tube 50 having a grid 51 connected to the conductor 30. This conductor is grounded, as indicated by the numeral 52, through a biasing resistor 53 which applies a proper bias between the grid 51 and a cathode 54. The tube 50 provides an anode or plate 55 connected by conductor 56 to one terminal of a resistance element 57, shown as the winding of a potentiometer. Similarly, an electron tube 60 provides a grid 61 connected to the conductor 31, which conductor is grounded as indicated at 62 through a biasing resistor 63 to apply a proper bias to cathode 64. An anode or plate 65 is connected by a conductor 66 to the other end of the resistance element. The requisite plate potentials for the tubes 50 and 60 are applied from a suitable source through a conductor 67 connnected to a movable contact 68 engaging the resistance element 57, this movable contact comprising an electrical center for the system and forming a convenient means for balancing the system when beams of equal intensity reach the ionization chambers 16 and 17. The fluctuating outputs of the tubes 50 and 60 are delivered through condensers 70 and 71 to the end terminals of a primary winding 72 of a transformer 73. This transformer provides a secondary winding 74 connected to the electron tube 40, as previously described, this portion of the circuit, as well as the remainder of the circuit beyond the tube 40, being as indicated in Fig. 1.

In the arrangement of Fig. 2, the potentials of the first and second circuits, amplified in this embodiment by the tubes 50 and 60, are supplied to the primary winding 72 in opposing relationship, the two circuits being balanced with respect to each other and with respect to ground by appropriate adjustment of the movable contact 68. The resulting net magnetic flux induces a net potential in the secondary winding 74, as previously described with reference to the secondary winding 35, and the connected indicating or recording means fed by the tube 40 will be accurately responsive to differences in intensity of the two transmitted beams and, correspondingly, to differences existing between the test specimen 18 and the reference specimen 19.

The embodiment of Fig. 3 is very similar to that of Fig. 2, employing the tubes 50 and 60 in the same relationship. Here, however, the source of plate potential is connected to the resistance element 57 through a center tap 75 thereof. The remaining connections to the transformer 73 are the same except that a potentiometer is employed to provide a balancing ground connection. This potentiometer includes a winding 76 connected in parallel with the primary winding 72 and having a grounded movable contact 77 adjustable to balance the first and second circuits.

In the embodiments of Figs. 1, 2, and 3, transformer means are employed to balance the outputs of the first and second circuits against each other to obtain a net output, the connections being such that the output potentials of the two circuits are 180° out of phase so as to oppose each other in the transformer. Another method of obtaining the desired out-of-phase relationship is by way of phase inversion, a typical circuit being suggested in Fig. 4.

Referring particularly to Fig. 4, the output of the ionization chamber 16 is delivered through the conductor 30, to one end of a potentiometer 79. The output of ionization chamber 17 is delivered through conductor 31 to one end of another potentiometer 79, the other terminal of which is grounded. A movable arm 80 of the potentiometer 79 is connected to grid 81 of an electron tube 82, which tubes effects the necessary phase shift. The tube 82 has a cathode 83, biased by resistor 84, one terminal of which is grounded as shown. The tube 82 also provides an anode or plate 85 to which a suitable plate potential is applied through resistor 86. The output of the tube 82 is delivered through condenser 87 to one end of the potentiometer 78 and appears there, by virtue of the characteristic action of the electron tube 82, 180° out of phase with the input supplied by the ionization chamber 16. The movable arm 80 on the potentiometer 79 is adjusted so that, when equal signals are applied to the conductors 30 and 31, the output of the tube 82, appearing at one end of the potentiometer 78, is equal to the signal appearing at the other end of the potentiometer 78 through the conductor 30. Since the thus balanced potentials applied at any instant to the ends of the potentiometer 78 are equal and of opposite polarity, the potential to ground from mid-point 88 of the potentiometer 78 is zero. The point 88 is connected through conductor 89 to a resistance element 90, thereby supplying a control potential to a grid 91 of an electron tube 92 having a cathode 93 appropriately biased, as by connection to a resistance element 94. The tube 92 acts as a voltage amplifier and provides an anode or plate 95 energized and connected to the indicating or recording means 44, as previously described.

The phase-inverting nature of the circuit will be further apparent from the following description of the operation of the embodiment shown in Fig. 4. Assume that a pulsating D. C. signal voltage is applied to the grid 81 of the tube 82 through the potentiometer 79 and that this signal voltage is positive. As the signal rises from zero, the grid 81 becomes more positive and this increases the flow of plate current, causing a drop in the voltage appearing at the plate 85 because of the increased IR drop in the resistor 84. This drop in voltage at the plate 85 causes a drop in the charge of the condenser 87, the net effect of which is to apply a negative signal to the right-hand end of the potentiometer 78. If the arm 80 of the potentiometer 79 is adjusted so that the fraction of the total signal applied to the grid 81 bears a direct proportionality to the voltage gain of the tube 82, then the net voltage gain of the tube 82 is zero and, for all practical purposes, the output of the ionization chamber 17 is displaced 180° and applied to one end of the potentiometer 78, without affecting the amplitude. Correspondingly, the output signals of the two ionization chambers are balanced against each other and any differential, resulting from a departure of the transmitted beams from pulsation equality, will set up a directional pulsating potential at the mid-point 88, which is carried to the grid 91 of the tube 92 and there amplified before being delivered to the indicating or recording means 44. In the system of Fig. 4, phase inversion is used to enable two signals, arising from separate sources, to be displaced 180° out of phase with each other in order that they may be balanced against each other and a net potential developed to feed a signal to the indicating or recording means 44.

Although I have chosen to describe specifically systems employing ionization chambers, it should be understood that the invention is applicable to other types of X-ray sensitive devices employing a saturation voltage. Further, other balanced circuits which utilize the basic principles of the present invention can be devised by employing the novel concept of energizing a pair of X-ray sensitive devices by a single source of voltage and opposing the pulsating outputs thereof to obtain a net pulsating voltage which varies in correspondence with the relative intensities of the two beams of ionizing radiation. The embodiments of the invention disclosed in detail have been selected by way of example to illustrate the principles involved. These will suggest to those skilled in the art various changes, modifications, and substitutions which do not depart from the underlying concept and which come within the scope of the appended claims.

I claim as my invention:

1. An apparatus for determining the relative intensities of two pulsating X-ray beams transmitted by two objects in the comparative industrial X-ray testing of such objects, said apparatus including: a single source of unidirectional voltage providing a terminal which is above ground potential and another terminal connected to ground; first and second ionization chambers connected to said first-named terminal of said voltage source and disposed respectively in the paths of said first and second X-ray beams to respectively produce pulsating output potentials corresponding to the pulsations of the respective transmitted X-ray beams; means for balancing said pulsating output potentials against each other to obtain a smaller pulsating net potential varying above ground potential with any differences between the intensities of the two transmitted beams, said balancing means including an impedance means having an electrical center and said balancing means including a grounded circuit connected to the electrical center of said impedance means; and a ground-referred voltage amplifier connected to said balancing means for amplifying said pulsating net potential.

2. An apparatus for determining the relative intensities of two pulsating X-ray beams transmitted by two objects in the comparative industrial X-ray testing of such objects, the combination of: a single source of unidirectional voltage having first and second terminals; means for grounding said first terminal; two X-ray sensitive devices connected to said second terminal and disposed respectively in the paths of said X-ray beams to respectively produce pulsating output potentials corresponding to the pulsations of the respective transmitted X-ray beams; means for balancing said pulsating output potentials against each other to obtain a smaller pulsating net potential varying above ground potential with any difference between the intensities of the two transmitted beams, said balancing means including an impedance means having an electrical center and said balancing means including a grounded circuit connected to the electrical center of said impedance means; a voltage amplifier providing an input circuit including a grid and a cathode; a conducting means connected between said cathode and ground; and means for applying said pulsating net potential to said grid.

3. In a system for determining the relative intensities of two pulsating beams of X-rays respectively transmitted by two objects, the combination of: a single source of unidirectional voltage providing a grounded terminal and another terminal; a pair of X-ray sensitive devices respectively disposed in said pulsating X-ray beams and connected to said other terminal, said X-ray sensitive devices respectively producing pulsating output potentials corresponding to the pulsations of the respective transmitting X-ray beams; an output means providing two end terminals and an intermediate output terminal; means for connecting one of said end terminals to receive the pulsating output potential of one of said X-ray sensitive devices; and a phase-inverting means receiving the pulsating output potential of the other X-ray sensitive device and supplying this output potential to the other of said end terminals, whereby the pulsating output potentials of said X-ray sensitive devices are applied to said end terminals 180° out of phase with each other to produce a pulsating net potential at said output terminal which varies with any difference between the intensities of the two pulsating X-ray beams.

4. A system as defined in claim 3 including a grid-controlled voltage amplifier, and means for supplying to the grid thereof a potential proportional to the pulsating net potential of said output terminal.

5. A system as defined in claim 3 in which said X-ray sensitive devices are ionization chambers and in which said phase-inverting means includes means for varying the magnitude of the potential derived from said other X-ray sensitive device and delivered to the other of said end terminals.

6. In a system for determining the relative intensities of two pulsating beams of X-rays by use of two high-impedance X-ray sensitive devices disposed respectively in said beams to produce pulsating output potentials corresponding to the pulsations of the respective X-ray beams, the combination of: a single source of unidirectional voltage providing a grounded terminal and another terminal; means for connecting each of said X-ray sensitive devices to said other terminal of said source; an output impedance providing two end terminals and an intermediate output terminal; means for connecting one of said end terminals to receive the pulsating output potential of one of said X-ray sensitive devices; an electron-tube phase-inverting means receiving the pulsating output potential of the other X-ray sensitive device and supplying this output potential to the other of said end terminals, whereby the pulsating output potentials of said X-ray sensitive devices are applied to said end terminals 180° out of phase with each other to produce a pulsating net potential at said output terminal which varies above ground potential with any difference between the intensities of the two pulsating X-ray beams; a voltage amplifier comprising an anode, a cathode and a control grid; a conducting means connected between said cathode and ground; and means for applying said pulsating net potential to said grid to produce an amplified output potential between said anode and ground.

7. In a system for determining the relative intensities of two pulsating beams of X-rays by use of two high-impedance X-ray sensitive devices disposed respectively in said beams to produce pulsating output potentials corresponding to the pulsations of the respective X-ray beams, the combination of: a single source of unidirectional voltage providing a grounded terminal and another terminal; means for connecting each of said X-ray sensitive devices to said other terminal of said source; an output impedance providing two end terminals and an intermediate output terminal; means for connecting one of said end terminals to receive the pulsating output potential of one of said X-ray sensitive devices; a phase-inverting means receiving the pulsating output potential of the other X-ray sensitive device for supplying a corresponding output potential to the other of said end terminals 180° out of phase with the pulsating output potential of said one of said X-ray sensitive devices to produce a pulsating net potential at said output terminal which varies above ground potential with an differences between the intensities of the two pulsating X-ray beams, said phase-inverting means including an electron tube providing a cathode, an anode and a control grid, means for applying between said control grid and said cathode a fraction of said pulsating output potential of said other X-ray sensitive device, and means for supplying the pulsations in potential of said anode to said other end terminal; a grid-controlled ground-referred amplifier; and means for applying said pulsating net potential to the grid of said amplifier.

HAROLD D. ROOP.

REFERENCES CITED

The following references are of record in the file of this patent:

UNITED STATES PATENTS

| Number | Name | Date |
| --- | --- | --- |
| 1,834,905 | Sheldon | Dec. 1, 1931 |
| 1,963,185 | Wilson | June 19, 1934 |
| 1,971,317 | Sheldon | Aug. 21, 1934 |
| 2,097,760 | Failla | Nov. 2, 1937 |
| 2,285,840 | Scherbatskoy | June 9, 1942 |
| 2,332,873 | Silverman | Oct. 26, 1943 |

FOREIGN PATENTS

| Number | Country | Date |
| --- | --- | --- |
| 293,240 | Germany | July 27, 1916 |
| 97,552 | Sweden | Dec. 5, 1939 |
| 554,001 | France | June 4, 1923 |

OTHER REFERENCES

Smith, General Electric Review, March 1945, vol. 48, pp. 13–17.

Certificate of Correction

Patent No. 2,513,818                                  July 4, 1950

HAROLD D. ROOP

It is hereby certified that error appears in the printed specification of the above numbered patent requiring correction as follows:

Column 3, line 25, before the word "from" insert *potential*; column 7, line 21, for "on end" read *one end*; column 10, line 27, for "an" read *any*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*